United States Patent
Kawada et al.

(10) Patent No.: US 8,769,791 B2
(45) Date of Patent: Jul. 8, 2014

(54) MACHINE TOOL

(75) Inventors: Takeshi Kawada, Kanagawa (JP);
Shinji Koike, Kanagawa (JP); Rintaro Nagatomo, Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 902 days.

(21) Appl. No.: 12/993,296

(22) PCT Filed: May 27, 2008

(86) PCT No.: PCT/JP2008/060108
§ 371 (c)(1),
(2), (4) Date: Nov. 18, 2010

(87) PCT Pub. No.: WO2009/144831
PCT Pub. Date: Dec. 3, 2009

(65) Prior Publication Data
US 2011/0070044 A1 Mar. 24, 2011

(51) Int. Cl.
*B25B 1/00* (2006.01)
(52) U.S. Cl.
USPC .................................. 29/281.1; 29/281.3
(58) Field of Classification Search
USPC .................. 29/281.1, 281.3, 281.5; 409/168
See application file for complete search history.

(56) References Cited

U.S. PATENT DOCUMENTS

| | | | |
|---|---|---|---|
| 3,700,228 A * | 10/1972 | Peale ............................... | 269/61 |
| 3,998,127 A * | 12/1976 | Romeu ........................ | 409/225 |
| 4,512,380 A | 4/1985 | Schmidt | |
| 5,562,134 A | 10/1996 | Sato | |
| 5,909,988 A | 6/1999 | Hoppe et al. | |
| 6,332,604 B1 * | 12/2001 | Chu ................................ | 269/71 |
| 7,134,173 B2 | 11/2006 | Gstir et al. | |
| 7,491,022 B2 * | 2/2009 | Kato et al. ..................... | 409/221 |
| 7,625,162 B2 * | 12/2009 | Stein ............................. | 409/168 |
| 7,645,103 B2 * | 1/2010 | Schmidt et al. ............... | 409/168 |
| 2006/0270540 A1 * | 11/2006 | Takayama et al. .............. | 483/41 |
| 2007/0196192 A1 * | 8/2007 | Stein ............................. | 409/168 |
| 2008/0175684 A1 * | 7/2008 | Schmidt et al. ............... | 409/211 |
| 2011/0070044 A1 * | 3/2011 | Kawada et al. ............... | 409/162 |

FOREIGN PATENT DOCUMENTS

| | | |
|---|---|---|
| CN | 2640692 Y | 9/2004 |
| DE | 3218107 A1 | 11/1983 |
| DE | 20204365 U1 | 5/2002 |
| EP | 1524067 A1 | 4/2005 |
| JP | 10180523 A | 7/1998 |
| JP | 200434168 A | 2/2004 |
| JP | 2006305692 A | 11/2006 |
| JP | 2006346799 A | 12/2006 |
| JP | 2007526136 A | 9/2007 |

* cited by examiner

*Primary Examiner* — Lee D Wilson
(74) *Attorney, Agent, or Firm* — Paul & Paul

(57) ABSTRACT

A machine tool for machining a workpiece with a tool moved relative to the workpiece is provided with a bed (13) providing a base, a column (15) vertically mounted on the bed (13), and a carriage (27) having supporting columns (27a and 27b), disposed on either side thereof, for oscillatably supporting a table (35), the carriage being oriented so that one (27b) of the supporting columns (27a and 27b) is positioned adjacent the column (15) and the other (27a) of the supporting columns is positioned away from the column (15).

7 Claims, 4 Drawing Sheets

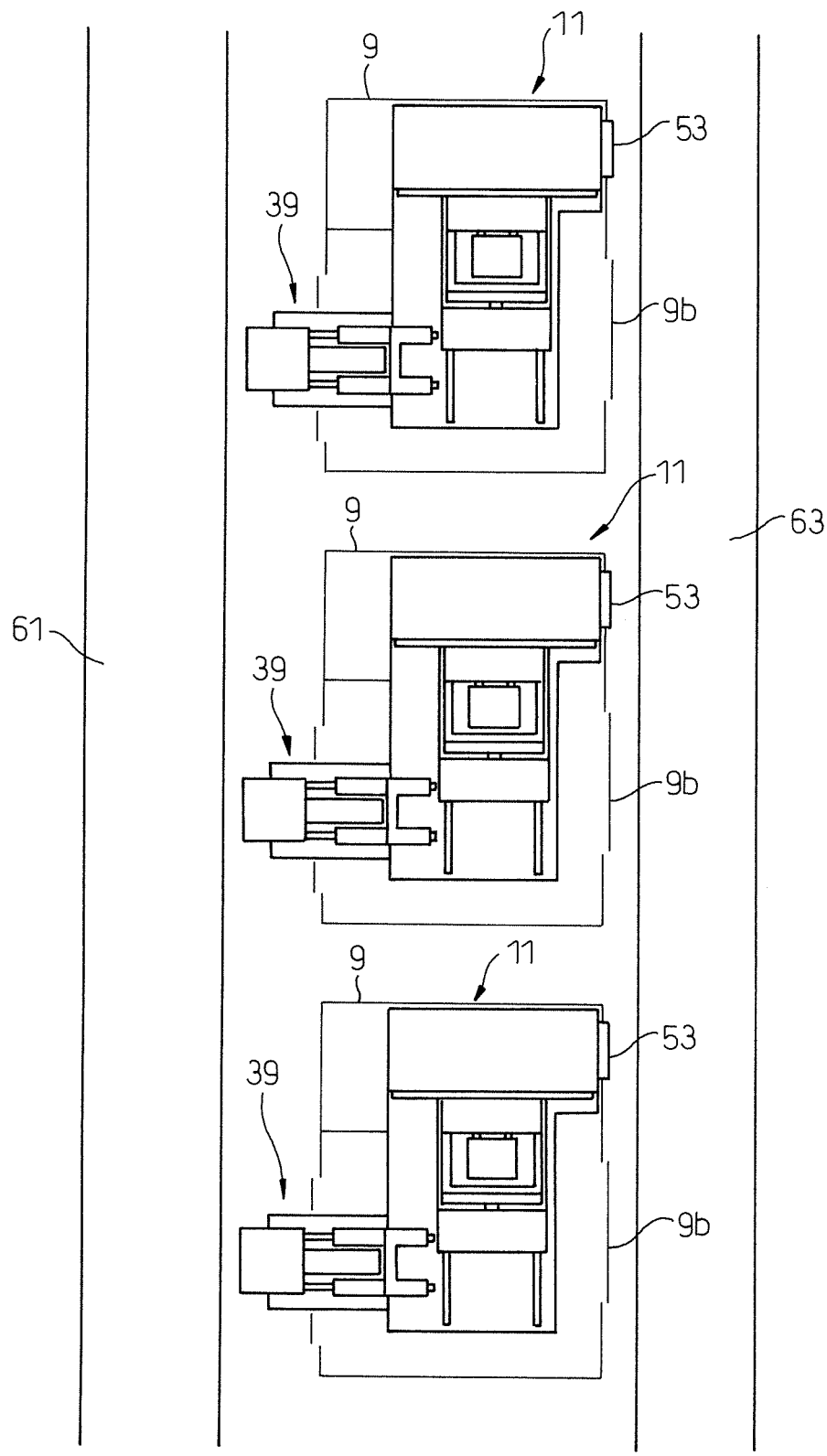

MACHINE TOOL

TECHNICAL FIELD

The present invention relates to a machine tool, having an oscillatory table, for machining a workpiece by moving a tool relative to the workpiece.

BACKGROUND ART

A multi-axis machine tool, having at least one rotary feed axis in addition to three orthogonal X-, Y- and Z-axis, is well known in the art. For example, JP-A-2006-305692 discloses a five-axis machining center provided with a pallet changer. The machining center includes a bed providing a base and a column vertically mounted on an upper face of the bed. In front of the column, the machine tool is provided with a trunnion type cradle which is movable linearly in Y-axis direction, perpendicular to the front face of the column, along the upper face of the bed. The cradle can further oscillate about a rotary feed axis, i.e., A-axis, parallel to the horizontal X-axis which is perpendicular to the Y-axis. A table is mounted to the cradle for rotation about another rotary feed axis, i.e., C-axis, perpendicular to the A-axis. A pallet, on which a workpiece is mounted, is detachably attached to the table.

DISCLOSURE OF THE INVENTION

The above-described cradle of the machining center is supported for rotation about the A-axis parallel to the X-axis. The pallet is changed by a pallet changer arranged in a front portion of the bed. Accordingly, the machining center disclosed in JP-A-2006-305692 has a problem that the trunnion of the cradle obstructs an operator to access and/or to operate with the workpiece secured to the table. Furthermore, because an operator accesses the workpiece from a position close to the pallet changer, there is a possibility that the pallet changer may interfere with the operator when a malfunction is caused in the pallet changer.

Accordingly, the present invention is directed to solve the problems of the prior art, and the objective of the present invention to provide a machine tool improved to allow easier access for a workpiece whereby the workability and the safety of the machine tool are improved.

The present invention provides a machine tool for machining a workpiece with a tool moved relative to the workpiece, comprising a bed providing a base, a column vertically mounted on the bed, and a carriage having supporting columns, disposed on either side thereof, for oscillatably supporting a table to which a workpiece is mounted, the carriage being oriented so that one of the supporting columns is positioned adjacent the column and the other of the supporting columns is positioned away from the column.

Further, the present invention provides a machine tool for machining a workpiece with a tool moved relative to the workpiece, comprising a bed providing a base, a bed comprising a base, a column vertically mounted on one end portion in the longitudinal direction of the bed, a carriage mounted on an upper face of the bed for linear motion in the longitudinal direction of the bed, a table mounted on the carriage for oscillation about an oscillation shaft extending parallel to the longitudinal direction of the bed, a saddle mounted to a front face of the column for horizontal motion perpendicular to the longitudinal direction of the bed, and a spindle head, mounted to the saddle for vertical linear motion perpendicular to the horizontal linear motion of the saddle, for supporting a main spindle for rotation about a vertical axis, the main spindle holding a tool to face the table.

BRIEF DESCRIPTION OF THE DRAWINGS

FIG. 4 is a schematic diagram showing a layout of a factory provided with the machine tools of the present invention.

THE MOST PREFERRED EMBODIMENT OF THE PRESENT INVENTION

Figure 1:
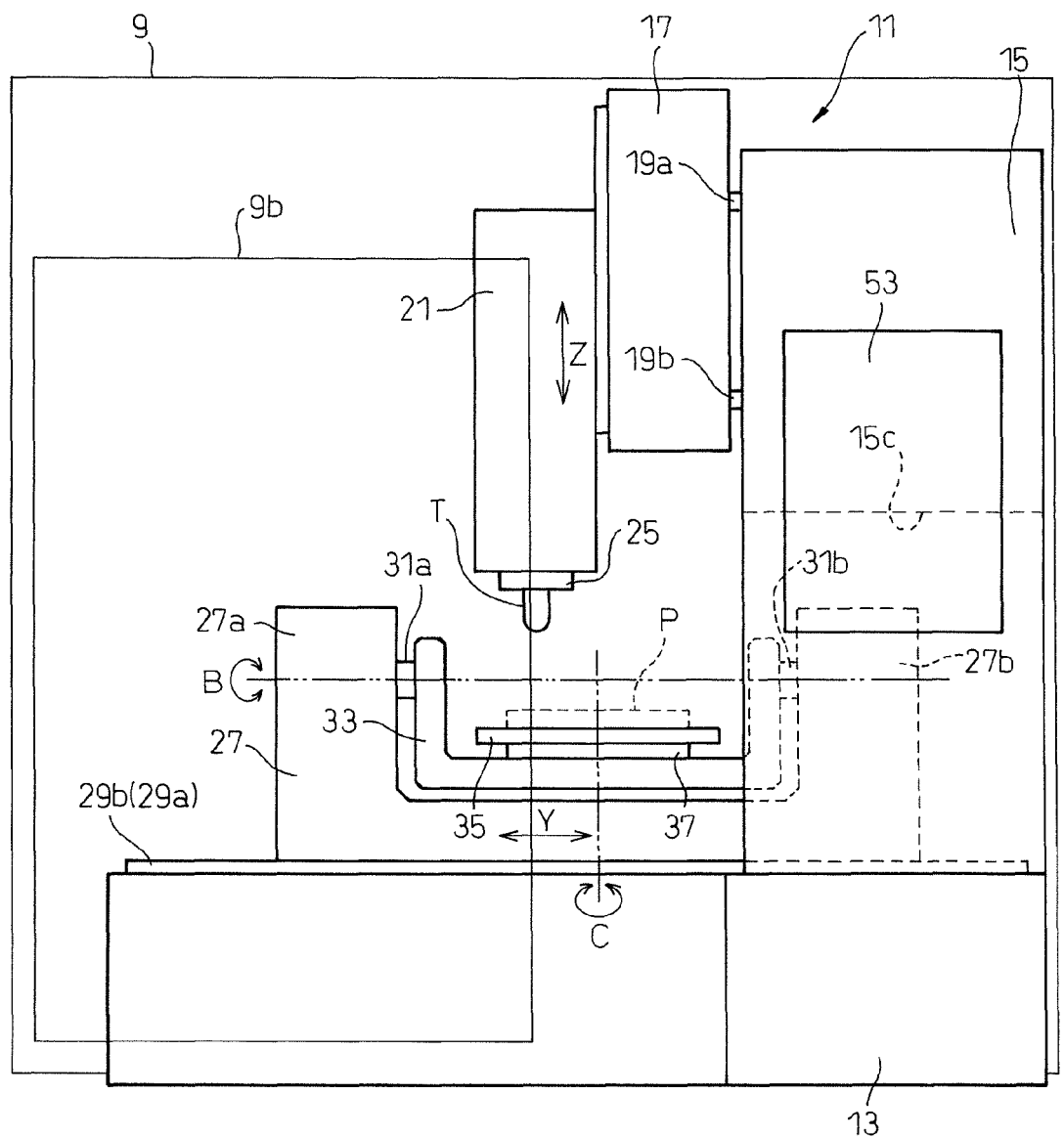
FIG. 1 is a side view of a machine tool according to a preferred embodiment of the present invention.
Figure 2:
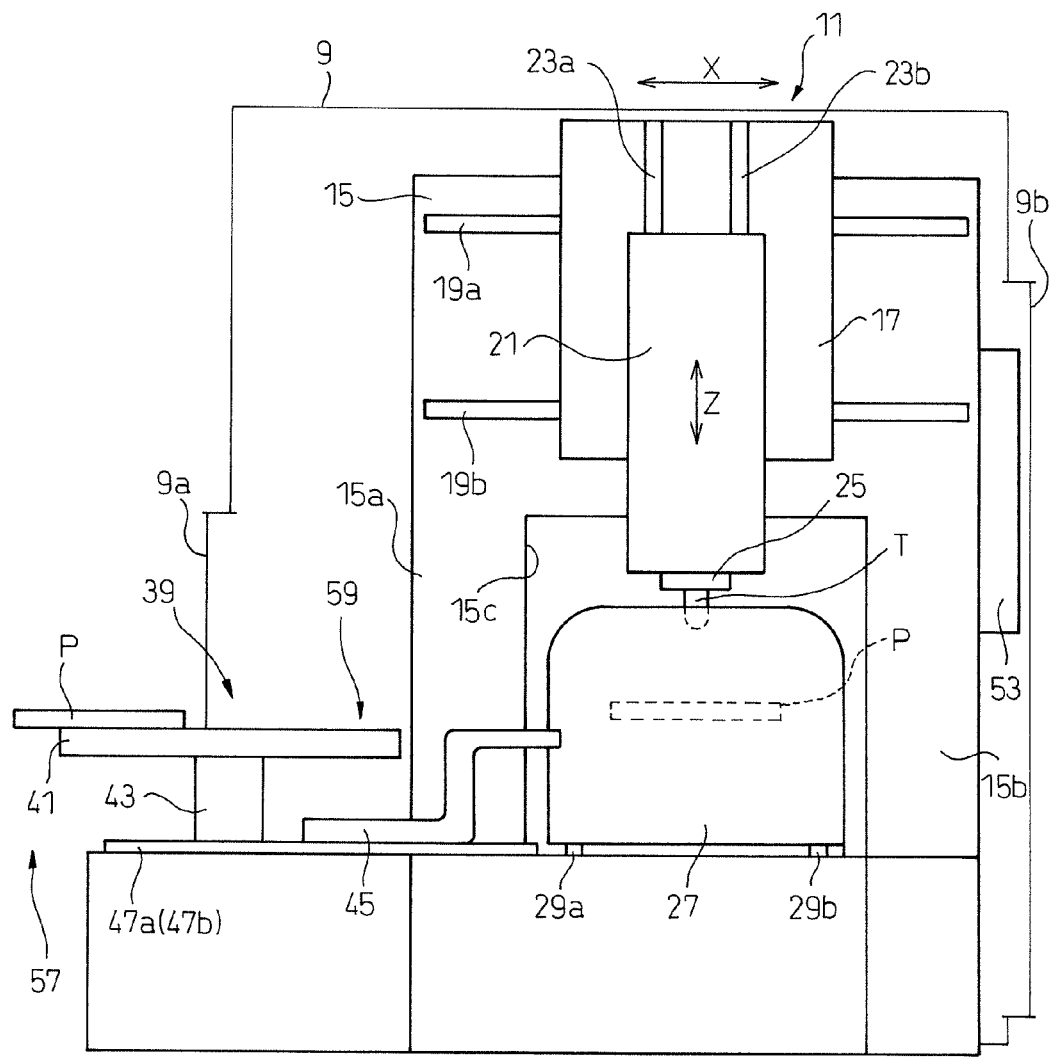
FIG. 2 is a front view of the machine tool shown in FIG. 1.
Figure 3:
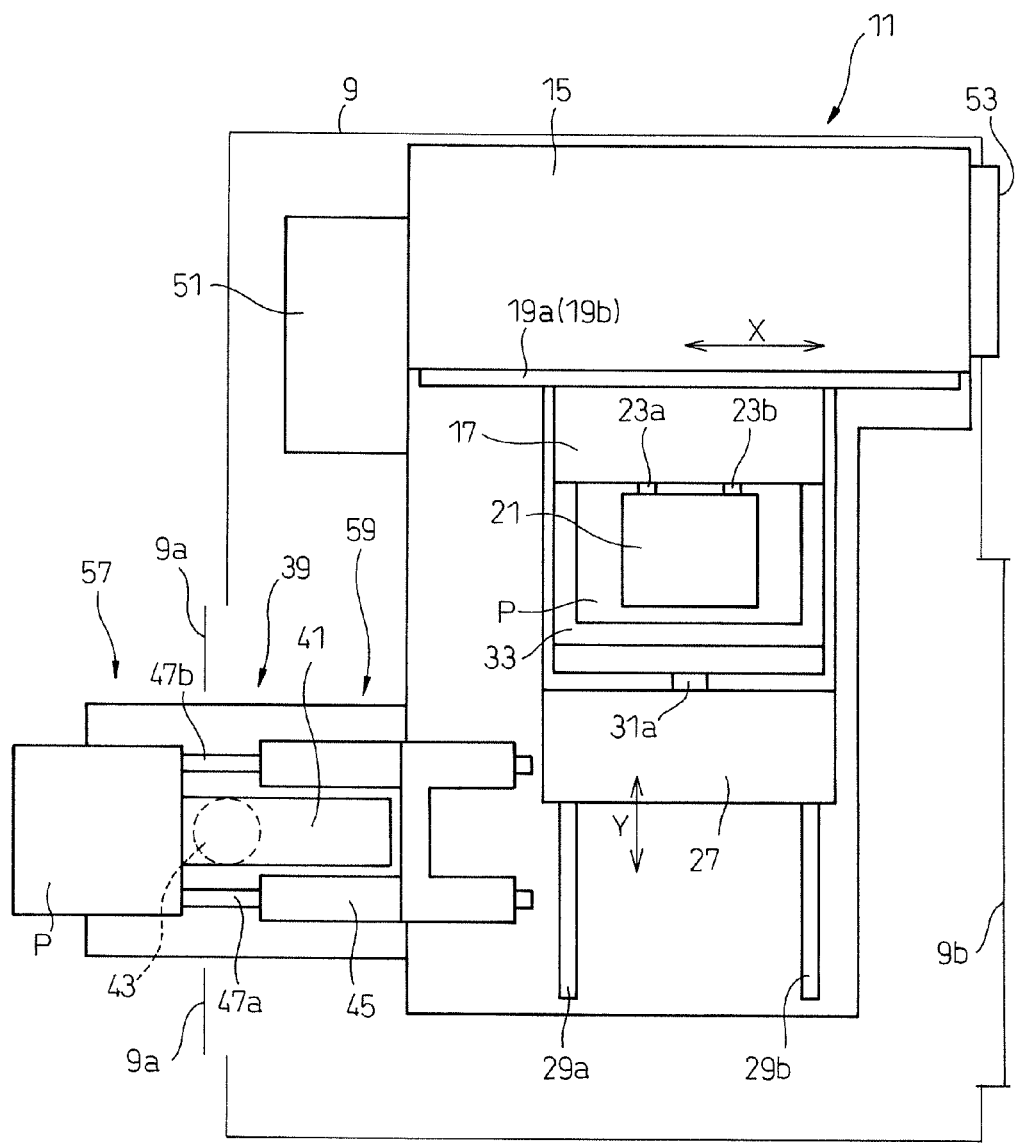
FIG. 3 is a plan view of the machine tool shown in FIG. 1.

With reference to the drawings, in particular FIGS. 1 to 3, the preferred embodiment of the present invention will be described below.

The machine tool 11 of the preferred embodiment of the present invention includes as main components a bed 13 providing a base, a column 15 vertically mounted on the upper face of the bed 13, a rotary table 35 arranged on the upper face of the bed 13 in the front of the column 15, a spindle head 21 supporting a main spindle 25 for rotation about a vertical axis (Z-axis) above the table 35, a saddle 17 supporting the spindle head 21 on the front face of the column 15, a pallet changer 39 arranged at one side of the bed 13, and an automatic tool changer 51 arranged between the pallet changer 39 and the column 15.

In this embodiment, the longitudinal direction of the table 35 (the right and left direction in FIG. 1) is defined as a Y-axis. The direction perpendicular to both the Y-axis and the Z-axis, which is center axis for rotation of the main spindle 25, is defined as an X-axis. The present invention may include a machine tool in which the longitudinal direction of the table 35 is defined as an X-axis and the direction perpendicular to the X- and the Z-axis is defined as a Y-axis.

In the present embodiment, the entire machine tool 11 is generally surrounded by a cover 9. The cover 9 includes a pallet door 9a for the pallet changer 39 and an access door 9b for an operator to access a workpiece on the table of the machine tool 11 as described later. The pallet door 9a and the access door 9b are arranged on either sides of the bed 13. In this connection, in the present embodiment, the access door 9b provides an access means through which an operator accesses the workpiece on the table 35. The access means may further include a footstool or a step disposed at a side of the bed 13.

The column 15 includes a pair of leg portions which are apart from each other in the X-axis direction so that a cavity portion 15c is formed. A pair of X-axis rails 19a and 19b are extended along the front face of the column 15. The saddle 17 is mounted to the column 15 for reciprocation along the X-axis rails 19a and 19b. The column 15 includes, as an X-axis feed means, a ball screw (not shown) extending in the X-axis direction, and an X-axis feed motor (not shown) connected to one end of the ball screw. The saddle 17 includes a nut (not shown) engaging the ball screw. In the present embodiment, an operation panel 53 may be mounted to the side of the column 15 opposite to the pallet changer 39. The operation panel may have an input device (not shown) for operating the machine tool 11 and a display unit (not shown) for displaying the state of operation of the machine tool 11.

A pair of Z-axis rails 23a and 23b extend along a front face of the saddle 17. The spindle head 21 is mounted to the saddle 17 for reciprocation along the Z-axis rails 23a and 23b. The saddle 17 includes, as a Z-axis feed means, a ball screw (not shown) which extending in the Z-axis direction, and a Z-axis feed motor (not shown) connected to one end of the ball screw. The spindle head 21 includes a nut (not shown) engaging the ball screw.

The spindle head 21 supports the main spindle 25 for rotation about the Z-axis so that the distal end portion of the main spindle 25 faces the table 35. Tool T is attached to the extend of the main spindle 25. The spindle head 21 includes a drive motor (not shown) for rotationally driving the main spindle 25.

A pair of Y-axis rails 29*a* and 29*b* extend along the upper face of the bed 13. A carriage 27 is mounted to the upper face of the bed 13 for reciprocation along the Y-axis rails 29*a* and 29*b*. At least a portion of the carriage 27 can enter the cavity portion 15*c* of the column 15. The bed 13 includes, as an Y-axis feed means, a ball screw (not shown) which extend in the Y-axis direction, and a Y-axis feed motor (not shown) connected to one end of the ball screw. The carriage 27 has a nut (not shown) engaging the ball screw.

As shown in FIG. 1, the carriage 27 is formed into a U-shape having a pair of supporting columns 27*a* and 27*b* which are apart from each other in the Y-axis direction. The supporting columns 27*a* and 27*b* rotatably support a pair of oscillation shafts 31*a* and 31*b* extending inwardly along Y-axis. One of the oscillation shafts 31*a* and 31*b* is connected to a B-axis feed motor (not shown) for rotationally feeding the oscillation shafts 31*a* and 31*b*. The B-axis feed motor is accommodated in one of the supporting columns 27*a* a 27*b*.

A U-shaped oscillating member 33 is connected to the ends of the oscillation shafts 31*a* and 31*b*. On the upper face of the oscillating member 33, a rotary table 35 is rotatably supported by a rotary shaft 37. A C-axis feed motor (not shown) for rotationally feeding the rotary table 35 is incorporated into the rotary shaft 37.

The pallet changer 39 includes a rotary arm 41 supported by a rotary shaft 43 perpendicular to the upper face of the bed 13, and a shifter 45. The shifter 45 is mounted on an upper face of the bed 13 for reciprocation along a pair of guide rails 47*a* and 47*b* extended in the X-axis direction. The rotary arm 41 is preferably mounted to the bed 13 so that one end portion can be positioned outside the cover 9. Incorporated into the bed 13 are a rotary motor (not shown), connected to the lower end of the rotary shaft 43, for rotating the rotary arm 41 and a hydraulic cylinder (not shown) for reciprocating the shifter 45 in the X-axis direction. The rotary arm 41 has a setup position 57, where one of the end portions is located outside the cover 9, and a handover position 59 wherein the cover 9 the pallet P is transported to the opposite end portion from the shifter 45 and vice versa.

According to the present embodiment, in the machine tool 11, one of the supporting columns 27*a* and 27*b* of the carriage 27 is positioned toward the column 15. Therefore, the pallet changer 39 can be positioned at one side of the bed 13. Accordingly, an operator of the machine tool 11 can access a workpiece on the table 35 from the opposite side of the bed 13 opposite to the pallet changer 39. Therefore, the workability and the safety of the machine tool 11 are remarkably improved.

Further, according to the present embodiment, when arranging a plurality of machine tools 11 in a factory, as shown in FIG. 4, a workpiece conveyance line 61, including a conveyer and an automatic conveyance system, can be arranged at a side where the pallet changers 39 are disposed, and an access passage 63 for an operator can be arranged at the opposite side with respect to Y-axis. The workpiece conveyance line 61 and the access passage 63 can be clearly separated from each other in a factory as described above, and therefore, the safety in the factory can be remarkably improved.

Further, according to the present embodiment, the access doors 9*b* of the covers 9 can be arranged toward the access passage 63 opposite to the pallet changers 39 with respect to Y-axis. Therefore, the operator can directly access the machine tools 11 from the access passage 63. This arrangement in a factory cannot be accomplished by the conventional machining center described above.

Furthermore, according to the present embodiment, the operation panels 53, adjacent the access doors 9*b*, can be also arranged near the access passage 63. Accordingly, an operator can directly access the operation panels 53 from the access passage 63. Therefore, the operability of the machine tools 11 can be remarkably improved.

According to another embodiment, instead of the pallet changer, an articulated robot detachably holding a workpiece may be employed as a workpiece changing means.

The invention claimed is:

1. A machine tool for machining a workpiece with a tool moved relative to the workpiece, comprising:
  a bed providing a base;
  a column vertically mounted on one end portion in the longitudinal direction of the bed; and
  a carriage having supporting columns, disposed on either sides thereof, for oscillatably supporting a table about an oscillation shaft extending parallel to the longitudinal direction of the bed to which table a workpiece is mounted, the carriage being oriented so that one of the supporting columns is positioned adjacent the column and the other of the supporting columns is positioned away from the column.

2. A machine tool for machining a workpiece with a tool moved relative to the workpiece, comprising:
  a bed providing a base;
  a column vertically mounted on one end portion in the longitudinal direction of the bed;
  a carriage mounted on an upper face of the bed for linear motion in the longitudinal direction of the bed;
  a table mounted on the carriage for oscillation about an oscillation shaft extending parallel to the longitudinal direction of the bed;
  a saddle mounted to a front face of the column for horizontal linear motion perpendicular to the longitudinal direction of the bed; and
  a spindle head, mounted to the saddle for vertical linear motion perpendicular to the horizontal linear motion of the saddle, for supporting a main spindle for rotation about a vertical axis, the main spindle holding a tool to face the table.

3. The machine tool according to claim 2, further comprising: workpiece changing means, mounted at one side of the bed with respect to the longitudinal direction of the bed, for changing a machined workpiece on the table with a non-machined workpiece; and access means for allowing to access a workpiece on the table from the side opposite to the workpiece changing means with respect to the longitudinal direction of the bed.

4. The machine tool according to claim 3, wherein the workpiece changing means comprises a pallet changer for changing a pallet to which a workpiece is mounted.

5. A machine tool for machining a workpiece with a tool moved relative to the workpiece, comprising:
  a bed providing a base;
  a column vertically mounted on one end portion in the longitudinal direction of the bed;

a carriage mounted on an upper face of the bed for linear motion in the longitudinal direction of the bed;

a table mounted on the carriage for oscillation about an oscillation shaft extending parallel to the longitudinal direction of the bed;

a saddle mounted to a front face of the column for horizontal linear motion perpendicular to the longitudinal direction of the bed;

a spindle head, mounted to the saddle for vertical linear motion perpendicular to the horizontal linear motion of the saddle, for supporting a main spindle for rotation about a vertical axis, the main spindle holding a tool to face the table;

workpiece changing means, mounted at one side of the bed with respect to the longitudinal direction of the bed, for changing a machined workpiece on the table with a non-machined workpiece; and access means for allowing to access a workpiece on the table from the side opposite to the workpiece changing means with respect to the longitudinal direction of the bed;

wherein the workpiece changing means comprises a pallet changer for changing a pallet to which a workpiece is mounted; and wherein the pallet changer includes:

a rotary arm rotatable about a vertical axis; and a shifter arranged between the rotary arm and the table for reciprocation in the horizontal direction perpendicular to the longitudinal direction of the bed, the shifter receiving a non-machined workpiece mounted to a pallet from the rotary arm together with the pallet to transport them to the table, and also receiving a machined workpiece mounted to a pallet from the table together with the pallet to transport them to the rotary arm.

6. The machine tool according to claim 3, wherein the workpiece changer comprises an articulated robot for detachably holding a workpiece.

7. The machine tool according to claim 2, the table including: an oscillating member having an oscillation shaft extending parallel to the longitudinal direction of the bed and attached to the carriage for oscillation; and a rotary table mounted on an upper face of the oscillating member for rotation about a vertical axis.

* * * * *